US012689089B2

(12) United States Patent
Yoon et al.

(10) Patent No.: US 12,689,089 B2
(45) Date of Patent: Jul. 21, 2026

(54) BATTERY MODULE, BATTERY PACK, AND VEHICLE INCLUDING SAME

(71) Applicant: LG ENERGY SOLUTION, LTD., Seoul (KR)

(72) Inventors: Hyoung-Chul Yoon, Daejeon (KR); Jae-Sang Kim, Daejeon (KR); Young-Su Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 807 days.

(21) Appl. No.: 17/918,046

(22) PCT Filed: Sep. 8, 2021

(86) PCT No.: PCT/KR2021/012241
§ 371 (c)(1),
(2) Date: Oct. 10, 2022

(87) PCT Pub. No.: WO2022/060002
PCT Pub. Date: Mar. 24, 2022

(65) Prior Publication Data
US 2023/0126646 A1 Apr. 27, 2023

(30) Foreign Application Priority Data
Sep. 21, 2020 (KR) ........................ 10-2020-0121768

(51) Int. Cl.
*H01M 50/342* (2021.01)
*H01M 50/213* (2021.01)
*H01M 50/271* (2021.01)
(52) U.S. Cl.
CPC ..... *H01M 50/3425* (2021.01); *H01M 50/213* (2021.01); *H01M 50/271* (2021.01)

(58) Field of Classification Search
CPC ........... H01M 50/3425; H01M 50/213; H01M 50/271; H01M 50/30; H01M 50/20; H01M 2200/00
See application file for complete search history.

(56) References Cited

U.S. PATENT DOCUMENTS

| | | | |
|---|---|---|---|
| 2009/0197153 A1 | 8/2009 | Fujikawa et al. | |
| 2014/0193674 A1* | 7/2014 | Takasaki | H01M 50/367 |
| | | | 429/53 |

(Continued)

FOREIGN PATENT DOCUMENTS

| | | |
|---|---|---|
| CN | 103474599 A | 12/2013 |
| CN | 106935746 A | 7/2017 |

(Continued)

OTHER PUBLICATIONS

Machine translation of KR20180091301A (Year: 2025).*

(Continued)

*Primary Examiner* — Tong Guo
*Assistant Examiner* — Albert Michael Hilton
(74) *Attorney, Agent, or Firm* — Morgan, Lewis & Bockius LLP

(57) ABSTRACT

Disclosed are a battery module with improved stability against fire or explosion, and a battery pack and a vehicle including the same. The battery module may include a plurality of battery cells, each having electrode terminals respectively formed at an upper portion and a lower portion thereof; a module case configured to accommodate the plurality of battery cells and having a plurality of exposure holes configured to expose the upper portion or the lower portion of the battery cell; and a screen member located at any one or more of an upper portion and a lower portion of the module case and having a plate shape, the screen (Continued)

100

140
130
C
C'
140 member being configured to have a ventilation hole with a smaller size than the exposure hole.

18 Claims, 6 Drawing Sheets

(56) References Cited

U.S. PATENT DOCUMENTS

| | | |
|---|---|---|
| 2015/0079426 A1 | 3/2015 | Chen et al. |
| 2015/0214524 A1 | 7/2015 | Takasaki et al. |
| 2016/0006007 A1 | 1/2016 | Takasaki et al. |
| 2016/0093853 A1 | 3/2016 | Nakamura et al. |
| 2016/0204404 A1 | 7/2016 | Shimizu et al. |
| 2017/0194610 A1 | 7/2017 | Tschiggfrei et al. |
| 2019/0097203 A1 | 3/2019 | Kwag et al. |
| 2019/0372069 A1 | 12/2019 | Lee et al. |
| 2020/0099114 A1 | 3/2020 | Ryu et al. |
| 2020/0313129 A1* | 10/2020 | Koutari ............. H01M 50/3425 |
| 2024/0145847 A1 | 5/2024 | Kim et al. |

FOREIGN PATENT DOCUMENTS

| | | |
|---|---|---|
| CN | 208507892 U | 2/2019 |
| CN | 111433939 A | 7/2020 |
| JP | 3242004 B2 | 12/2001 |
| JP | 5338331 B2 | 11/2013 |
| JP | 2014-197452 A | 10/2014 |
| JP | 2016-72069 A | 5/2016 |
| JP | 2017-84637 A | 5/2017 |
| JP | 6274064 B2 | 2/2018 |
| KR | 10-2016-0149285 A | 12/2016 |
| KR | 20180091301 A * | 8/2018 ........... H01M 2/345 |
| KR | 10-2019-0032887 A | 3/2019 |
| KR | 10-2019-0094921 A | 8/2019 |
| KR | 10-2072098 B1 | 1/2020 |
| WO | 2014/038184 A1 | 3/2014 |
| WO | 2014/132649 A1 | 9/2014 |
| WO | 2015/064096 A1 | 5/2015 |
| WO | WO-2018003290 A1 * | 1/2018 ......... H01M 10/643 |
| WO | 2020/154759 A1 | 8/2020 |

OTHER PUBLICATIONS

Extended European Search Report dated May 7, 2024 issued in European Patent Application No. 21869624.3.
International Search Report (with partial translation) and Written Opinion dated Dec. 27, 2021, for corresponding International Patent Application No. PCT/KR2021/012241.

* cited by examiner

BATTERY MODULE, BATTERY PACK, AND VEHICLE INCLUDING SAME

TECHNICAL FIELD

The present disclosure relates to a battery module, a battery pack and a vehicle including the same, and more particularly, to a battery module with improved stability against fire or explosion, a battery pack and a vehicle including the same.

The present application claims priority to Korean Patent Application No. 10-2020-0121768 filed on Sep. 21, 2020 in the Republic of Korea, the disclosures of which are incorporated herein by reference.

BACKGROUND ART

In recent years, the demand for portable electronic products such as notebooks, video cameras, mobile phones, or the like is rapidly increasing, and the development of electric vehicles, energy storage batteries, robots, satellites, or the like is in earnest. For this reason, high-performance secondary batteries enabling repeated charging and discharging are being actively researched.

Secondary batteries commercialized at the present include nickel cadmium batteries, nickel hydrogen batteries, nickel zinc batteries, and lithium secondary batteries. Among them, lithium secondary batteries are in the spotlight due to advantages such as free charging and discharging by little memory effect compared to nickel-based secondary batteries, and very low self-discharge rate and high energy density.

The lithium secondary battery mainly uses a lithium-based oxide and a carbon material as a positive electrode active material and a negative electrode active material, respectively. Also, the lithium secondary battery includes an electrode assembly in which a positive electrode plate and a negative electrode plate respectively coated with the positive electrode active material and the negative electrode active material are disposed with a separator being interposed therebetween, and an exterior, namely a battery case, for hermetically storing the electrode assembly together with an electrolyte.

In addition, the lithium secondary battery may be classified depending on the exterior shape into a can-type secondary battery in which an electrode assembly is included in a metal can and a pouch-type secondary battery in which an electrode assembly is included in a pouch made of an aluminum laminate sheet.

In particular, the demand for large-capacity battery modules applied to electric vehicles or the like is increasing recently. Such a large-capacity battery module includes a plurality of battery cells. Thus, when a fire or explosion occurs in a part of the plurality of battery cells, high-temperature fragments of the electrode assembly, flames, and high-temperature gas are discharged to adjacent other battery cells to increase the temperature thereof. Accordingly, thermal runaway, fire, or the like may be propagated to adjacent other battery cells to cause a secondary explosion, thereby increasing the damage.

DISCLOSURE

Technical Problem

The present disclosure is designed to solve the problems of the related art, and therefore the present disclosure is directed to providing a battery module with improved stability against fire or explosion, a battery pack and a vehicle including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a plurality of battery cells, each having electrode terminals respectively formed at an upper portion and a lower portion thereof;

a module case configured to accommodate the plurality of battery cells and having a plurality of exposure holes configured to expose the upper portion or the lower portion of the battery cell; and a screen member located at any one or more of an upper portion and a lower portion of the module case and having a plate shape, the screen member being configured to have a ventilation hole with a smaller size than the exposure hole.

Also, two or more ventilation holes may be provided in a region of the screen member that faces the exposure hole.

In addition, the ventilation hole may be configured to have a diameter gradually decreasing in an outward direction.

Also, the ventilation hole may be shaped so that the screen member is perforated in a zigzag form.

Moreover, the battery module may further comprise a connection plate interposed between the screen member and the module case and having electric conductivity, the connection plate including a body portion having a plate shape extending in a horizontal direction, a connection portion extending from the body portion to contact the electrode terminal, and a connection hole formed by opening a part of the body portion so that the connection portion is located in the opening thereof.

In addition, the connection plate may include an extension portion configured to protrusively extend in a horizontal direction from an outer circumference of the connection hole to hide a part of the connection hole.

Further, the module case may include a plurality of cover portions configured to protrude toward the connection plate from an outer circumference of the plurality of exposure holes, respectively, the cover portion having a hollow and being shaped to have an open top end.

Also, the cover portion may include a bending part bent at the open top end to extend in a horizontal direction to hide a part of the connection hole of the connection plate.

In addition, in another aspect of the present disclosure, there is also provided a battery pack, comprising at least one battery module as above.

Moreover, in another aspect of the present disclosure, there is also provided a vehicle, comprising at least one battery module as above.

Advantageous Effects

According to an embodiment of the present disclosure, the battery module according to the present disclosure includes the screen member. This structure may physically block the movement of a high-temperature active material discharged from the exploded battery cell to adjacent battery cells while maintaining the function of ejecting the gas and flame generated when the battery cell is ignited. By doing so, when any one of the plurality of battery cells behaves abnormally (electric short, thermal runaway), if the battery cell explodes to eject the internal material to the outside, gas and flame are ejected through the exposure hole, but the movement of the high-temperature active material is suppressed by the screen member. Therefore, it is possible to prevent the ejected internal material from moving to other adjacent battery cells through other adjacent exposure holes. That is, by forming the ventilation hole to be smaller than the exposure hole, the screen member may allow the high-temperature gas ejected through the exposure hole to pass through the ventilation hole, but prevents the ejected fragments of the electrode assembly from passing through the ventilation hole. Accordingly, in the present disclosure, it is possible to prevent chain ignition, such as propagating of thermal runaway, fire or explosion to other battery cells, thereby greatly improving the safety.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
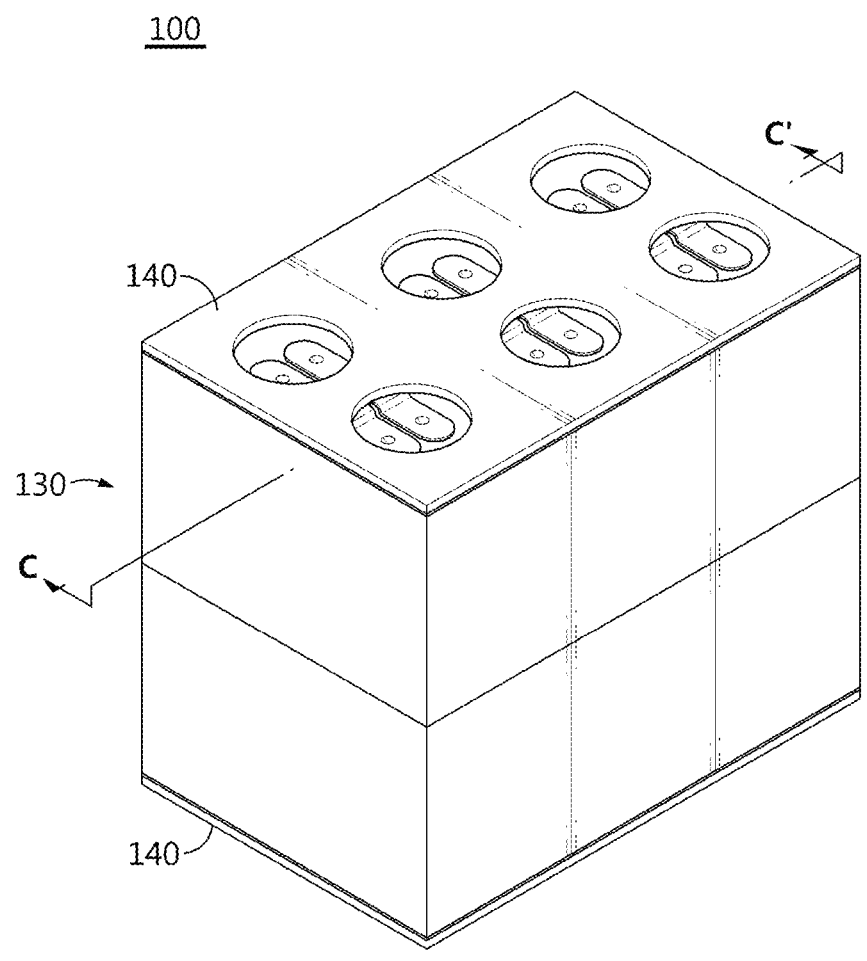
FIG. 1 is a perspective view schematically showing a battery module according to an embodiment of the present disclosure.
Figure 2:
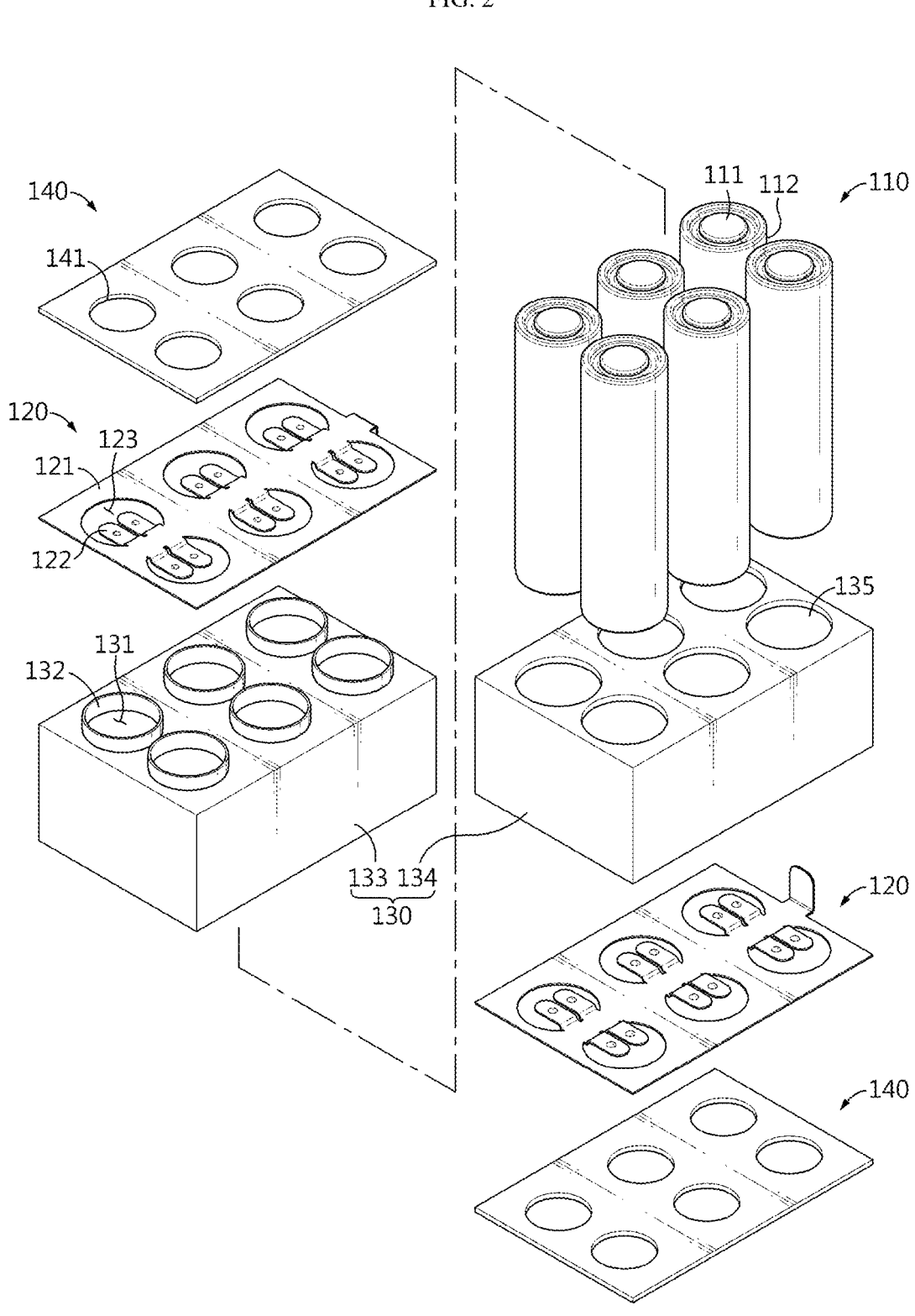
FIG. 2 is an exploded perspective view schematically showing the battery module according to an embodiment of the present disclosure.

FIG. 1 is a perspective view schematically showing a battery module according to an embodiment of the present disclosure. FIG. 2 is an exploded perspective view schematically showing the battery module according to an embodiment of the present disclosure. Also, FIG. 3 is a sectional view schematically showing a battery cell of the battery module according to an embodiment of the present disclosure.

Figure 3:
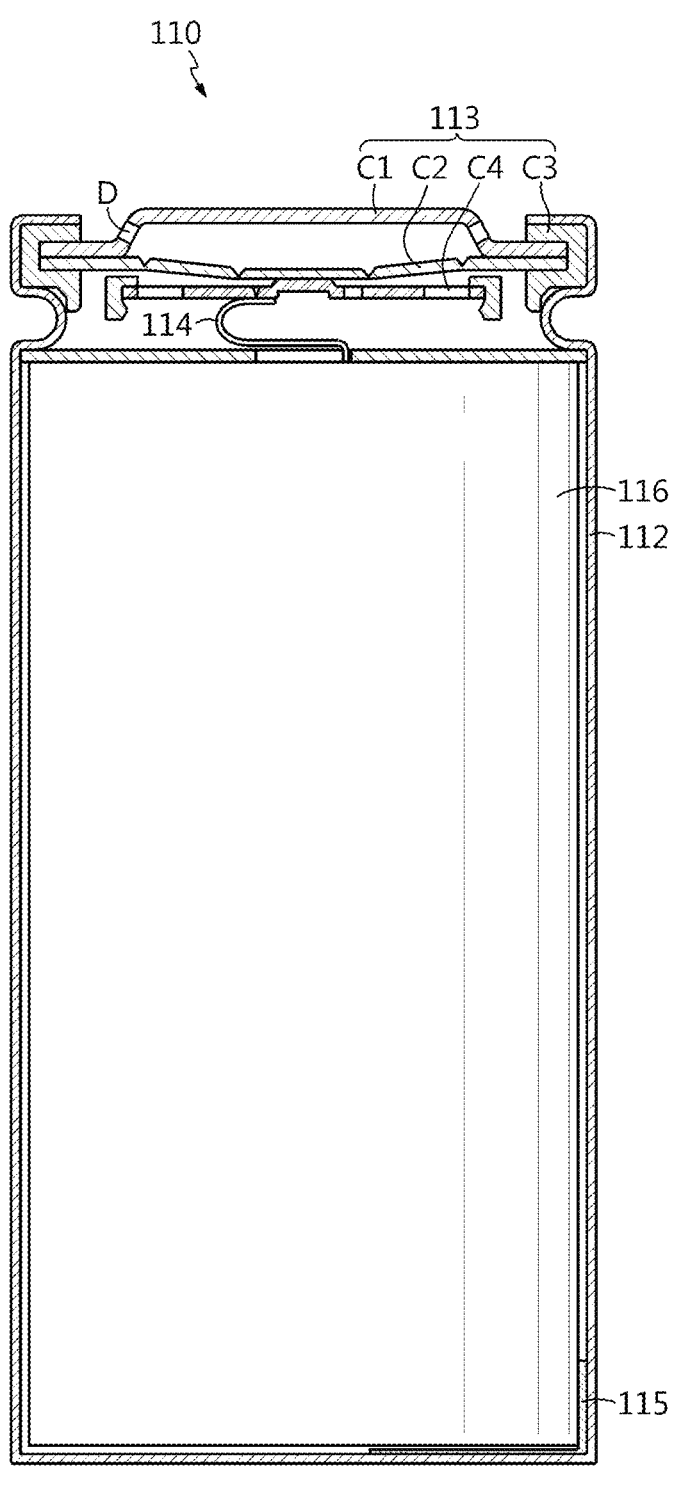
FIG. 3 is a sectional view schematically showing a battery cell of the battery module according to an embodiment of the present disclosure.

Referring to FIGS. 1 to 3, a battery module 100 according to an embodiment of the present disclosure includes a plurality of battery cells 110, a module case 130, and a screen member 140.

Specifically, the battery cell 110 may include an electrode assembly 116, a battery can 112, and a cap assembly 113. For example, the battery cell 110 may be a cylindrical battery cell. In addition, the battery cell 110 may include electrode terminals 111 respectively located at an upper portion and a lower portion thereof. The plurality of battery cells 110 may be electrically connected by a connection plate 120 having a metal material. The plurality of battery cells 110 may be electrically connected in series, in parallel, or in series and in parallel, through the connection plate 120.

The electrode assembly 116 may have a wound structure with a separator being interposed between a positive electrode plate and a negative electrode plate. A positive electrode tab 114 may be attached to the positive electrode plate and connected to the cap assembly 113, a negative electrode tab 115 may be attached to the negative electrode plate and connected to a lower end of the battery can 112.

The battery can 112 may have an empty space so that the electrode assembly 116 may be accommodated therein. In particular, the battery can 112 may be configured in a cylindrical shape with an open top end. In addition, the battery can 112 may be made of a metal material such as steel or aluminum to secure rigidity. In addition, the negative electrode tab may attached to the bottom of the battery can 112, such that not only the lower portion of the battery can 112 but also the battery can 112 itself may function as a negative electrode terminal.

The cap assembly 113 may be coupled to the open top end of the battery can 112 to seal the open top end of the battery can 112. The cap assembly 113 may have a circular or rectangular shape depending on the shape of the battery can 112, and may include sub-components such as a top cap C1, a vent unit C2, and a gasket C3.

Here, the top cap C1 may be located at an uppermost portion of the cap assembly 113 and configured to protrude upward. In particular, the top cap C1 may function as a positive electrode terminal in the battery cell 110. Accordingly, the top cap C1 may be electrically connected to an external device, for example another battery cell 110 or a charging device, through the connection plate 120 or the like. The top cap C1 may be made of, for example, a metal material such as stainless steel or aluminum. If a severe explosion or fire occurs at the battery cell 110, at least a part of the top cap C1 may be torn or detached from the battery can 112, thereby opening the battery can 112.

In addition, the vent unit C2 may be configured to be deformed (ruptured) when the internal pressure of the battery cell 110, namely the internal pressure of the battery can 112, increases over a predetermined level, so that the gas inside the battery can 112 may be discharged to the outside through an opening D of the top cap C1. Here, the predetermined level of the internal pressure may be 5 to 10 atmospheres. At this time, when the battery cell 110 explodes due to an abnormal behavior, the cap assembly 113 may be detached from the battery can 112. In addition, when gas explodes in the battery cell 110, the gas generated therein and fragments of the electrode assembly 116 or the like may be ejected to the outside.

Moreover, the gasket C3 may be made of a material with electrical insulation so that edge portions of the top cap C1 and the vent unit C2 may be insulated from the battery can 112.

Meanwhile, the cap assembly 113 may further include a current interrupt device C4. The current interrupt device C4 is also called CID. When the internal pressure of the battery increases due to gas generation so that the shape of the vent unit C2 is reversed, the contact between the vent unit C2 and the current interrupt device C4 may be broken, or the current interrupt device C4 may be damaged, thereby blocking the electrical connection between the vent unit C2 and the electrode assembly 116.

The above configuration of the battery cell 110 is widely known to those skilled in the art at the time of filing of this application, and thus will not be described in more detail. In addition, although an example of the cylindrical battery cell 110 is illustrated in FIG. 3, the battery module 100 according to the present disclosure is not limited to the configuration of the battery cell 110 having a specific shape. That is, various types of battery cells known at the time of filing of this application may be employed in the battery module 100 according to the present disclosure.

In addition, the module case 130 may be configured to accommodate the plurality of battery cells 110 therein. The module case 130 may include an upper frame 133 and a lower frame 134. Each of the upper frame 133 and the lower frame 134 may include a plurality of hollows 135 configured so that the plurality of battery cells 110 are partially inserted therein.

Moreover, the module case 130 may have a plurality of exposure holes 131. Each of the plurality of exposure holes 131 may be formed by perforating a part of the module case 130 so that the upper portion and the lower portion of each of the plurality of battery cells 110 may be exposed to the outside. For example, as shown in FIG. 2, a plurality of exposure holes 131 may be provided in each of the upper surface of the upper frame 133 and the lower surface of the lower frame 134 so that the electrode terminals 111 respectively provided to the upper portion and the lower portion of the plurality of battery cells 110 are exposed to the outside. The exposure hole 131 may be formed at a position corresponding to the vent unit C2 of the battery cell 110. For example, in the battery cell 110 of FIG. 3, the vent unit C2 is located at a top end of the battery cell 110, and thus the exposure hole 131 may be provided at the top end of the battery cell 110. More specifically, the exposure hole 131 may be provided at a position adjacent to the opening D of the top cap C1 through which the gas discharged from the vent unit C2 is discharged to the outside of the battery can 112.

Preferably, the exposure hole 131 may be formed in a size that may cover the entire opening D of the battery can 112. For example, referring to FIG. 3 as an example, the top cap C1 of the battery can 112 may have a ring-shaped opening D. At this time, the exposure hole 131 may be configured to have a diameter greater than or equal to the diameter of the ring-shaped opening D.

In addition, the screen member 140 may be located in any one or more of the upper portion and the lower portion of the module case 130. For example, as shown in FIG. 1, each of the two screen members 140 may be located at the upper portion and the lower portion of the module case 130. The screen member 140 may be made of a material having high thermal conductivity while being electrically insulating. For example, the screen member 140 may include a silicone resin.

The screen member 140 may have a plate shape as a whole. For example, the screen member 140 may have a plate shape extending in a horizontal direction to cover a portion of the module case 130 where the plurality of exposure holes 131 are formed. Each screen member 140 may have a ventilation hole 141 having a smaller size than the exposure hole 131. The ventilation hole 141 may have a size of 10% to 80% based on the size of the exposure hole 131, for example. In addition, when the battery cell 110 is configured to open a specific part by an explosion, the ventilation hole 141 may be configured to have a smaller size than the opening size of the opened portion.

Therefore, according to this configuration of the present disclosure, the battery module 100 according to the present disclosure includes the screen member 140. This structure may physically block the movement of a high-temperature active material discharged from the exploded battery cell to adjacent battery cells while maintaining the function of ejecting, namely venting, the gas and flame generated when the battery cell is ignited. By doing so, when any one of the plurality of battery cells 110 behaves abnormally, if the battery cell 110 explodes to eject the internal material to the outside, gas and flame are ejected through the exposure hole 131, but the movement of the high-temperature active material is suppressed by the screen member 140. Therefore, it is possible to prevent the ejected internal material from moving to other adjacent battery cells 110 through other adjacent exposure holes 131. That is, by forming the ventilation hole 141 to be smaller than the exposure hole 131, the screen member 140 may allow the high-temperature gas ejected through the exposure hole 131 to pass through the ventilation hole 141, but prevents the ejected fragments of the electrode assembly from passing through the ventilation hole 141. Accordingly, in the present disclosure, it is possible to prevent chain ignition, such as propagating of thermal runaway, fire or explosion to other battery cells 110, thereby greatly improving the safety.

Figure 4:
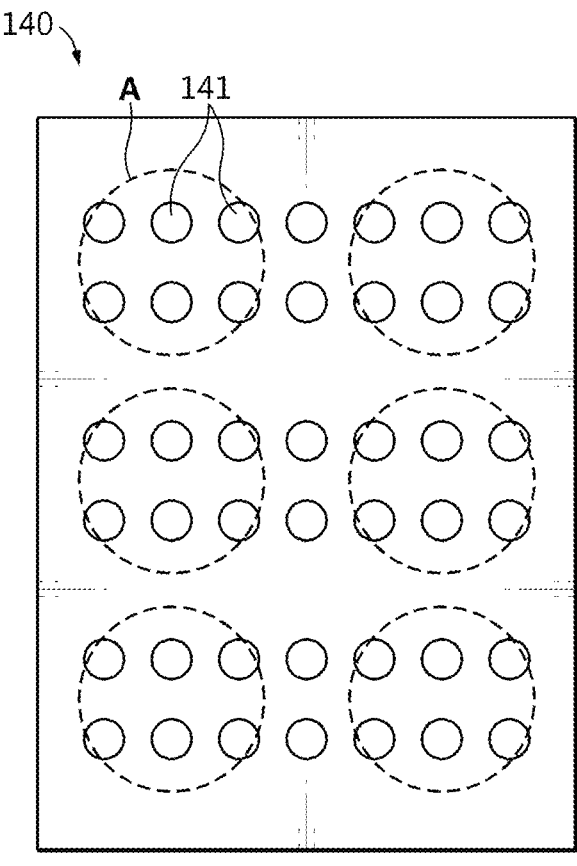
FIG. 4 is a plan view schematically showing a screen member of a battery module according to another embodiment of the present disclosure.

FIG. 4 is a plan view schematically showing a screen member of a battery module according to another embodiment of the present disclosure.

Referring to FIG. 4 along with FIG. 2, in a battery module 100 according to another embodiment of the present disclosure, two or more screen members 140 may be provided in a region A where the ventilation hole 141 faces the exposure hole 131. For example, as shown in FIG. 4, the screen member 140 may have six regions A facing six exposure holes 131. At this time, approximately six ventilation holes 141 may be located in six regions A of the screen member 140 respectively facing the six exposure holes 131.

Therefore, according to this configuration of the present disclosure, since the screen member 140 of the present disclosure has two or more ventilation holes 141 at positions corresponding to the exposure holes 131, when the battery cell 110 explodes, the ejected gas is effectively discharged, and fragments of the electrode assembly may be screened not to pass through the ventilation hole 141. That is, a part of the plurality of ventilation holes 141 may be formed at positions spaced apart not to face the opening of the battery cell 110 that is generated in the battery cell 110 when the battery cell 110 explodes, thereby preventing the scattered solid materials from passing through the ventilation hole 141.

Figure 5:
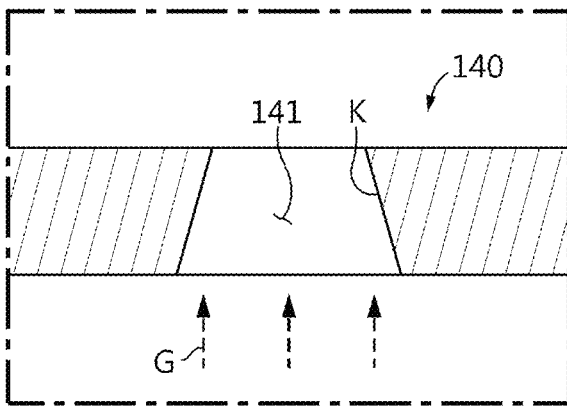
FIG. 5 is a partial sectional view schematically showing a screen member of a battery module according to still another embodiment of the present disclosure.

FIG. 5 is a partial sectional view schematically showing a screen member of a battery module according to still another embodiment of the present disclosure.

Referring to FIG. 5 along with FIG. 2, in the screen member 140 of the battery module 100 according to still another embodiment of the present disclosure, the ventilation hole 141 may be configured to have a diameter gradually decreasing in an outward direction (a direction away from the battery cell 110, an upper direction in this embodiment). That is, a tapered structure K may be provided on the inner surface of the ventilation hole 141. For example, as shown in FIG. 5, an inlet of the ventilation hole 141 at an inner side close to the battery cell 110 may be larger than an outlet at an outer side. Moreover, the ventilation hole 141 may have an inclined inner surface that is inclined toward the diameter center of the opening from the inlet at an inner side to the outlet at an outer side.

Therefore, according to this configuration of the present disclosure, in the present disclosure, since the ventilation hole 141 is configured to have a diameter gradually decreasing in an outward direction, when the battery cell 110 explodes, it is possible to effectively discharge the ejected gas G but prevent the accompanying fragments of the electrode assembly from passing by being blocked by the inclined inner surface of the ventilation hole 141. That is, if the ventilation hole 141 has an inner surface of the tapered structure K so that its diameter gradually decreases in an outward direction, the area capable of screening the fragments of the electrode assembly may be further increased, thereby more effectively preventing the scattered solid materials from passing through the ventilation hole 141.

Figure 6:
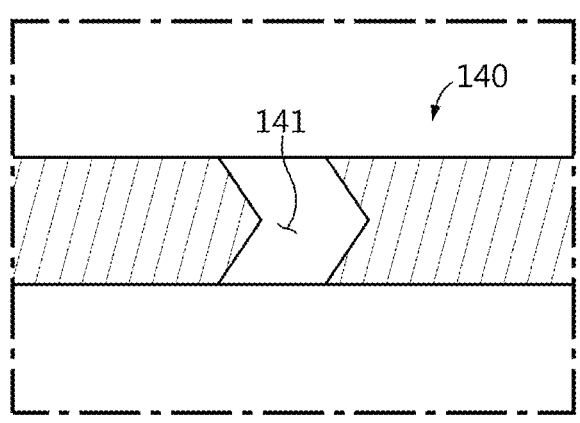
FIG. 6 is a partial sectional view schematically showing a screen member of a battery module according to still another embodiment of the present disclosure.

FIG. 6 is a partial sectional view schematically showing a screen member of a battery module according to still another embodiment of the present disclosure.

Referring to FIG. 6 along with FIG. 2, in the screen member 140 of the battery module 100 according to still another embodiment of the present disclosure, the ventilation hole 141 may be shaped so that the screen member 140 is perforated in a zigzag form along the thickness direction of the screen member 140. For example, the ventilation hole 141 may be shaped so that the ventilation hole 141 is perforated to be inclined in one direction from an inlet formed close to the battery cell 110, and the penetrating direction is changed to be inclined in the other direction at the other side.

Therefore, according to this configuration of the present disclosure, since the screen member 140 of the present disclosure has the ventilation hole 141 of a zigzag form, when the battery cell 110 explodes, the ejected gas may pass through the ventilation hole 141, but accompanying fragments of the electrode assembly may be blocked by the inclined inner surface of the ventilation hole 141 not to pass. Accordingly, in the present disclosure, the high-temperature fragments of the electrode assembly do not move to other adjacent battery cells 110 due to the explosion of the battery cell 110, thereby preventing thermal runaway or fire from occurring due to the moved fragments of the electrode assembly.

Meanwhile, referring to FIG. 2 again, the battery module 100 of the present disclosure may further include a connection plate 120. The connection plate 120 may be interposed between the screen member 140 and the module case 130. The connection plate 120 may have electrical conductivity. For example, the connection plate 120 may include a metal such as aluminum, copper, or nickel.

In addition, the connection plate 120 may include a body portion 121, a connection portion 122, and a connection hole 123. The body portion 121 may have a plate shape extending in a horizontal direction. The body portion 121 may be mounted to the upper portion or the lower portion of the module case 130. For example, as shown in FIG. 2, the two connection plates 120 may be mounted to the upper portion and the lower portion of the module case 130, respectively.

Moreover, the connection portion 122 may be formed to extend from the body portion 121 to contact the electrode terminal 111. For example, as shown in FIG. 2, the connection portion 122 may have a bifurcated structure protrusively extending from the body portion 121. The connection portion 122 may be welded to the electrode terminal 111. At this time, as a welding method, resistance welding may be used, for example.

In addition, the connection hole 123 may be configured such that a part of the body portion 121 is opened and the connection portion 122 is located inside the opening. The connection hole 123 may have an approximately circular shape. The connection hole 123 may be configured to face the exposure hole 131 of the module case 130.

Figure 7:
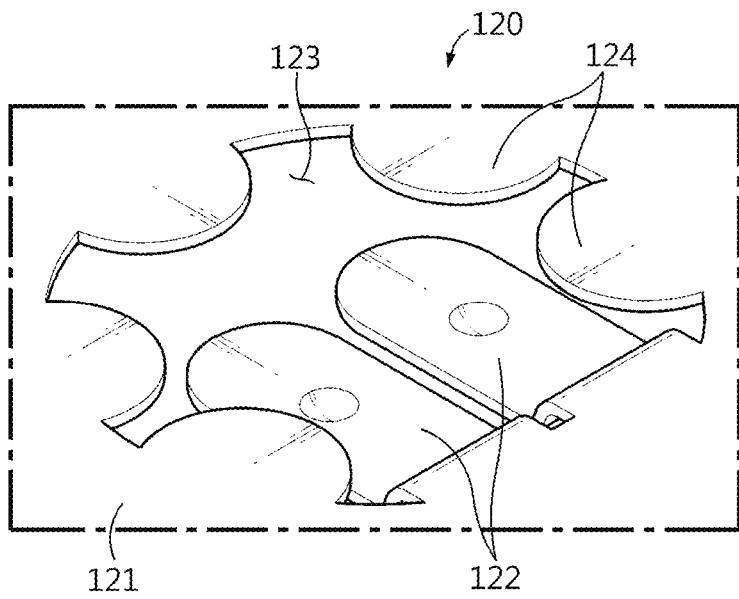
FIG. 7 is a partial perspective view schematically showing a connection plate of the battery module according to still another embodiment of the present disclosure.

FIG. 7 is a partial perspective view schematically showing a connection plate of the battery module according to still another embodiment of the present disclosure.

Referring to FIG. 7, the connection plate 120 may include an extension portion 124 configured to cover a part of the connection hole 123. The extension portion 124 may have a shape protrusively extending from an edge of the connection hole 123 in a horizontal direction. The extension portion 124 may be a portion protruding toward the connection portion 122 from the edge of the connection hole 123. For example, as shown in FIG. 7, the connection plate 120 may be configured such that five extension portions 124 protrude from the edge of the connection hole 123 toward the connection portion 122.

Figure 8:
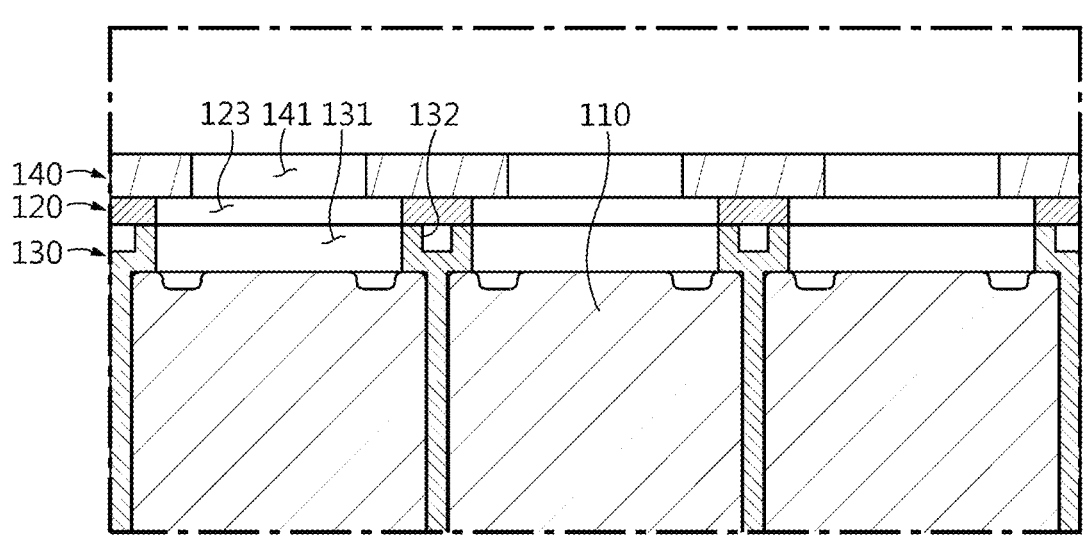
FIG. 8 is a partial sectional view schematically showing a part of the battery module, taken along the line C-C' of FIG. 1.

FIG. 8 is a partial sectional view schematically showing a part of the battery module, taken along the line C-C' of FIG. 1.

Referring to FIG. 8 along with FIGS. 1 and 2, in the battery module 100 according to an embodiment of the present disclosure, a plurality of cover portions 132 may be provided to the upper surface or the lower surface of the module case 130. The plurality of cover portions 132 may have a rib shape protruding toward the connection plate 120 from an outer circumference of each of the plurality of exposure holes 131. The cover portion 132 may be formed with a hollow penetrating in a vertical direction. The cover portion 132 formed on the upper surface of the module case 130 may have an open top end. For example, as shown in FIG. 2, the module case 130 may include six cover portions 132 protruding from the upper surface of the module case 130 toward the connection plate to cover the six exposure holes 131.

In addition, the connection plate 120 may be mounted on the top end of the cover portion 132. That is, the top surface of the cover portion 132 may be in contact with the lower surface of the connection plate 120. In addition, the screen member 140 may be mounted to the upper surface of the connection plate 120. The exposure hole 131, the connection hole 123 and the ventilation hole 141 may be configured to communicate with each other. Therefore, ultimately, the vent unit C2 of the battery cell 110, the opening D of the top cap C1, the exposure hole 131, and the ventilation hole 141 may all be positioned on the same line. Accordingly, the path for discharging gas is minimized, so that the gas may be smoothly discharged to the outside of the battery cell 110. The space between the upper surface of the upper frame 133 and the connection plate 120 may serve as a venting space in front of the battery cell 110.

Moreover, when an abnormal behavior of the battery cell 110 occurs so that the internal material is ejected to the outside, the cover portion 132 may be configured to prevent the internal material from moving to other adjacent battery cells 110 through other adjacent exposure holes 131. The cover portion 132 may have a cylindrical shape to surround the exposure hole 131.

Therefore, according to this configuration of the present disclosure, the module case 130 included in the battery module 100 according to the present disclosure includes the cover portion 132 protruding from the outer circumference of the exposure hole 131 toward the connection plate 120. This structure may physically block the movement of a high-temperature active material discharged from the exploded battery cell to adjacent battery cells while maintaining the function of ejecting, namely venting, the gas and flame generated when the battery cell is ignited. By doing so, when the battery cell 110 behaves abnormally to explode so that the internal material is ejected, gas and flame are ejected through the exposure hole 131, but the movement of the high-temperature active material is suppressed by the cover portion 132. Therefore, it is possible to prevent the internal material from moving to other adjacent battery cells 110 through other exposure holes 131, thereby preventing chain ignition, such as propagating of thermal runaway, fire or explosion to other battery cells 110. Accordingly, the present disclosure may greatly improve the safety.

In the present disclosure, since the top surface of the cover portion 132 is in contact with the lower surface of the connection plate 120, even if an explosion occurs in some of the plurality of battery cells 110, it is possible to prevent the high-temperature active material, gas and flame from moving to adjacent battery cells 110 through the empty space between the connection plate 120 and the module case 130. The space between the upper surface of the upper frame 133 and the connection plate 120 serves as a venting space in front of the battery cell 110, and the cover portion 132 maintains the venting space in an upward direction of the battery cell 110, while making the venting space maintaining the venting space to be independent for each battery cell 110 in a lateral direction of the battery cell 110. Accordingly, the cover portion 132 may suppress that the high-temperature active material is discharged to move to adjacent battery cells 110, while maintaining the function of ejecting the gas and flame generated during ignition. The cover portion 132 constitutes an isolated mechanism structure for each battery cell 110 so as to suppress the scattering of an active material mass. In this way, chain ignition may be suppressed, thereby greatly improving the safety of the battery module 100 of the present disclosure.

Figure 9:
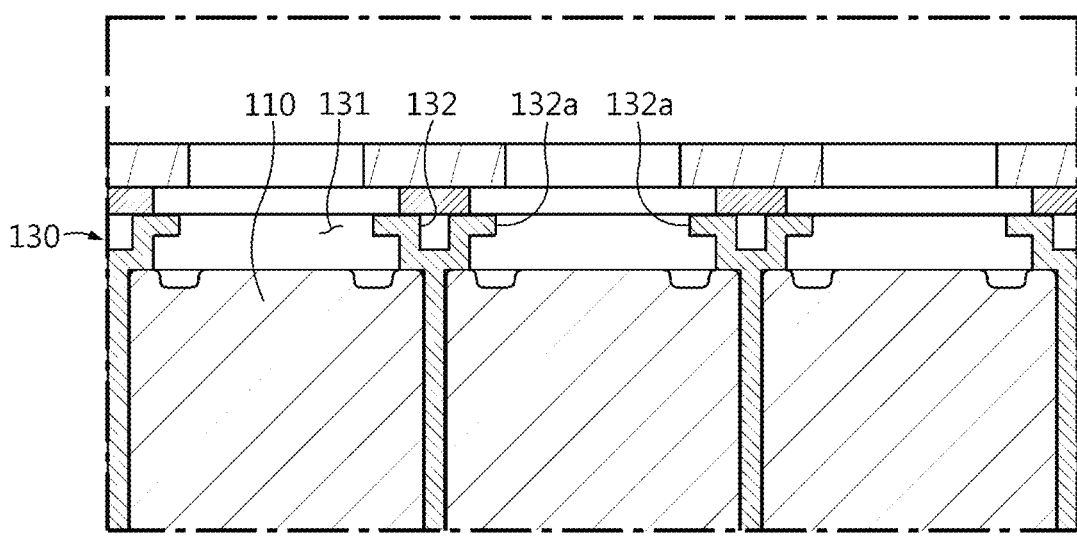
FIG. 9 is a vertical sectional view schematically showing a part of the battery module according to still another embodiment of the present disclosure.

FIG. 9 is a vertical sectional view schematically showing a part of the battery module according to still another embodiment of the present disclosure.

Referring to FIG. 9, in the battery module 100 according to still another embodiment of the present disclosure, when compared with the cover portion of FIG. 8, the cover portion 132 may further include a bending part 132a. The bending part 132a may be configured to hide a part of the exposure hole 131 of the module case 130. The bending part 132a may be a portion bent to extend in a horizontal direction from an end of the cover portion 132 protruding upward. The bending part 132a may be configured to hide a part of the open end formed by the hollow of the cover portion 132. For example, the bending part 132a may be configured to be bent toward the central from the open end of the upper portion of the cover portion 132 so that the opening of the open end is more narrowed.

Therefore, according to this configuration of the present disclosure, in the present disclosure, even if an explosion occurs in some of the plurality of battery cells 110 to eject an internal material (e.g., an active material), the amount of material discharged to the outside of the module case 130 may be effectively reduced by the bending part 132a. Accordingly, it is possible to effectively reduce the movement of the internal material ejected from the exploded battery cell 110 to other adjacent battery cells 110. Ultimately, in the present disclosure, it is possible to provide the battery module 100 with greatly improved safety.

Meanwhile, a battery pack according to an embodiment of the present disclosure may include at least one battery module 100 as described above and a battery management system (BMS) electrically connected to the battery module 100. The BMS may include various circuits or elements to control charging and discharging of the plurality of battery cells.

Meanwhile, a vehicle (not shown) according to an embodiment of the present disclosure may include at least one battery module 100 as described above and a vehicle body having an accommodation space for accommodating the battery module 100. For example, the vehicle may be an electric vehicle, an electric scooter, an electric wheelchair, or an electric bike.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

What is claimed is:

1. A battery module, comprising:

a plurality of battery cells, each having electrode terminals respectively formed at an upper portion and a lower portion thereof;

a module case configured to accommodate the plurality of battery cells and having a plurality of exposure holes, each of the plurality of exposure holes configured to expose the upper portion or the lower portion of a corresponding battery cell of the plurality of battery cells;

a screen member located at any one or more of an upper portion and a lower portion of the module case and having a plate shape, the screen member being configured to have a ventilation hole with a size smaller than a size of a corresponding exposure hole of the plurality of exposure holes; and a connection plate interposed between the screen member and the module case, wherein the connection plate includes:

a body portion having a plate shape extending in a horizontal direction;

a connection portion extending from the body portion to contact a corresponding electrode terminal;

a connection hole formed by an opening in the body portion; and an extension portion protrusively extending in the horizontal direction from an outer circumference of the connection hole toward the connection portion, wherein the extension portion extends from the body portion in the horizontal direction so that the extension portion is located at a same level as the body portion in a vertical direction, and wherein:

a plurality of ventilation holes are provided in a region of the screen member;

the plurality of ventilation holes include the ventilation hole;

the plurality of ventilation holes face only one exposure hole among the plurality of exposure holes; and each of the plurality of ventilation holes includes an inclined inner surface to allow gas to pass while blocking passing of fragments of an electrode assembly.

2. The battery module according to claim 1, wherein two or more ventilation holes are provided in a region of the screen member that faces two or more exposure holes of the plurality of exposure holes.

3. A battery pack, comprising the battery module according to claim 2.

4. A vehicle, comprising the battery module according to claim 2.

5. The battery module according to claim 1, wherein the ventilation hole is configured to have a diameter gradually decreasing in an outward direction.

6. A battery pack, comprising the battery module according to claim 5.

7. A vehicle, comprising the battery module according to claim 5.

8. The battery module according to claim 1, wherein the ventilation hole is shaped so that the screen member is perforated in a zigzag form.

9. A battery pack, comprising the battery module according to claim 8.

10. A vehicle, comprising the battery module according to claim 8.

11. The battery module according to claim 1, wherein:

the connection plate has electric conductivity; and the connection portion is located in the opening of the body portion.

12. A battery pack, comprising the battery module according to claim 11.

13. A vehicle, comprising the battery module according to claim 11.

14. The battery module according to claim 1, wherein the module case includes a plurality of cover portions configured to protrude toward the connection plate from outer circumferences of the plurality of exposure holes, respectively, a cover portion of the plurality of cover portions having a hollow and being shaped to have an open top end.

15. The battery module according to claim 14, wherein the cover portion of the plurality of cover portions includes a bending part bent at the open top end to extend in the horizontal direction toward a middle of a respective exposure hole among the plurality of exposure holes.

16. A battery pack, comprising the battery module according to claim 1.

17. A vehicle, comprising the battery module according to claim 1.

18. The battery module according to claim 1, wherein the connection portion extends from the body portion and does not extend from the extension portion.

* * * * *